Reissued Apr. 29, 1952 Re. 23,484

UNITED STATES PATENT OFFICE 23,484

METHOD OF MAKING CULINARY MIXES

Ogden Johnson, Bronxville, N. Y., assignor to Ford, Bacon & Davis, Inc., New York, N. Y., a corporation of New Jersey No Drawing. Original No. 2,499,586, dated March 7, 1950, Serial No. 3,817, January 22, 1948. Application for reissue March 20, 1951, Serial No. 216,672

10 Claims. (Cl. 99—94)

Matter enclosed in heavy brackets [ ] appears in the original patent but forms no part of this reissue specification; matter printed in italics indicates the additions made by reissue.

My invention relates to culinary mixes. This expression is used herein to refer to dry appearing mixes comprising flour and shortening and which may or may not comprise other ingredients such as sugar, dried eggs, dried milk, leavening agents, flavors, etc. These culinary mixes can be formed into a batter or dough by the addition of water, milk or other edible aqueous liquid, and baked into cakes, breads, biscuits, muffins, pie crusts, and similar baked products.

In culinary mixes of the type defined herein, flour and shortening are invariably included as ingredients, and other ingredients may or may not be included, depending upon the type of mix and the nature of the product. It is the flour and shortening and their relation to each other which is of particular importance in a product. It is known, for example, that the exact nature and condition of the shortening, and the manner of incorporating it in the mix, plays an essential part in the leavening process of many products, and the characteristic structure of cakes, for example, depends largely upon the type of shortening and method of incorporating it. The fat plays an important role in the leavening of many products and its particular action in this respect is exemplified in the manufacture of ordinary yellow cakes. In the process of making such a cake, the sugar dissolves in the liquid ingredients and this mixes freely with the particles of flour but not with the shortening. The dough is, in effect, a two-phase system. The air within the batter is associated with the fat and the air is not entrapped in the aqueous phase of the dough. According to Bailey[1] the exact mechanics of the leavening process are a matter of conjecture, but the development of the gas pocket during the leavening requires a cleavage of the dough mass, and it is reasonable to assume that the cleavage occurs along the shortening boundaries. It will thus be seen that the shortening contributes to an important aspect of the leavening process.

Another important function of a shortening in a baked product is that of imparting "shortness" which is essentially a result of lubrication. On examination of a finished baked product, it will show that the solid material is not homogeneous and the continuity of the starch and gluten structure of the flour is broken by films of shortening. The latter weaken the structure

[1] Alton E. Bailey: "Industrial Oil and Fat Products," Interscience Publishers, N. Y. (1945). This book is relied upon as authority for many of the statements herein.

of the product sufficiently to make it tender or short.

The shortening action of oils and fats and their contribution to the leavening process varies particularly with different oils and fats. One aspect of shortenings which has been regarded as invaluable in certain baked products, such as cakes, biscuits and pie crusts, is the plasticity of the shortening, and the inadequacy of oils and other liquid shortening agents is thought to be due to their lack of plasticity. For this reason the art has preferred the use of a so-called "plastic" shortening and great pains have been taken to develop shortenings with optimum plastic properties.

The method of imparting the designed plasticity to shortenings is essentially one of quick chilling the melted fat, generally with agitation, and the method probably most commonly in use today is that of votating. The latter action is essentially one of very quick chilling with agitation. The chilling takes place in a small refrigerated cylinder through which the melted fat is pumped. The cylinder is equipped with fast revolving scraper blades which bear against the cylinder walls and scrape off the chilled film on the refrigerated surface as fast as it is formed. Because of the fact that the fat is chilled so rapidly in contact with extremely cold surfaces, the shortening at the time it leaves the chilling cylinder is in a super-cooled, liquid condition. By liquid is meant a condition in which the shortening will flow, such as heavy cream. For example, in the chilling unit the melted fat may be cooled from about 110 to 120° F. to about 60 to 70° F. and the chilling is so rapid that the shortening leaves the chilling unit in a liquid condition, although it is normally solid at this temperature. Since the crystal nuclei have, nevertheless, been established and the shortening is super-cooled, it will complete the rest of its solidification without the use of refrigeration and this will be accompanied by a rise in temperature due to the release of the latent heat of crystallization. For example, the shortening may be agitated after leaving the chilling cylinder and the temperature may rise to 75 to 85°. It is common for a freshly super-cooled or votated shortening to have a temperature of 80 to 85°. Even after such further solidification due to crystallization from the super-cooled fat, the shortening, nevertheless, is in a liquid condition and may be readily pumped through pipes and will flow into a drum with a consistency much like that of very heavy cream. Other methods of chilling, besides that of votating, may be used to produce a liquid super-cooled shortening.

The shortening issuing from the filling nozzle is liquid and is normally packed in drums or containers in this liquid condition, but after packing there are still further transformations which take place which cause the shortening to assume its characeristic plastic condition in the drum. It generally takes a considerable time before the shortening in the drum assumes its final plastic consistency. This setting-up process in the drum comprises delayed crystallization or other changes in crystal structure within the product due to the super-cooling. It is important to note that the development of the final pllasticity occurs, however, after the shortening is packed in the drum. Usually the packed shortening is tempered by subjecting it to a temperature of about 80° F. after packing. The plasticity which is characteristic of the final crystalline structure resulting from the setting-up in the drums and the other transformation which occurs during tempering, is thought to be responsible for the desirable baking properties of the shortening.

In the ordinary manufacture of culinary mixes, the plastic, tempered shortening, which has heretofore been thought to have optimum properties for preparing baked products, is removed from the drums and mixed with the flour and such other ingredients as are to be in the product. This process requires considerable labor and mixing power. The shortening in the drums, because of its characteristic plastic condition, must be scooped or shoveled out of the drums into the mixer where it is to be blended with the other components of the mix. This involves considerable labor and is generally a hand operation. Because of the plastic characteristics of the shortening, the power required for mixing it with the flour is relatively great and the mixing time required for a plastic shortening is considerable if the desired uniform distribution is to be obtained.

I have discovered, in accordance with this invention, that contrary to what might have been expected from the known properties of shortening, that a shortening in a liquid, super-cooled condition, such as freshly votated shortening, may be admixed directly with the flour or any other components forming the prepared culinary mix. This was surprising to me because the shortening in this condition does not have the tempered plasticity which has heretofore been thought to be a requisite characteristic before mixing. Furthermore, the super-cooled shortening is in the liquid condition and more nearly approaches the liquid shortening agents which have heretofore been recognized as having poor shortening properties. Contrary to what might have been expected from these known considerations, I have discovered that cakes and other culinary products made from mixes in accordance with the invention are superior in many respects, particularly cake volume, to culinary products made from plastic shortening. The invention not only has the advantage of producing culinary mixes which give superior baked products, but also avoids considerable labor in removing the plastic shortening from the drums, and in power required and time consumed in mixing it with the flour and any other ingredients. By means of the invention it is also possible to specify the exact mixing time, because the super-cooled liquid shortening has a uniformity which is in contrast to the variable condition of plastic shortening.

In practicing my invention, the flour [and] *or* any other ingredients that are to be in the mix, are placed in the mixer and the liquid, super-cooled shortening is run directly into the mixer, thus saving all packaging and tempering problems and the subsequent handling of plastic shortening. Because of the liquid condition of the shortening in its super-cooled condition, the power requirements for mixing the shortening with the flour are minimized, and mixing time is materially decreased. The mixing may also be on a continuous basis.

While no theory need be or is advanced to explain the enhanced results obtained in accordance with the invention, it is assumed that the shortening in the liquid stage, at the time it is mixed with the flour, does not have its final crystal configuration, and is still in a super-cooled or not fully crystallized condition, and that the final crystalline structure develops while the shortening is in intimate contact with the particles of flour and this, in some way, improves the character of the baked product. This is surprising to me in view of the known fact that liquid shortenings are less satisfactory because the liquid oil tends to penetrate and saturate the flour particles rather than coat or envelop them with the plastic fat film, which action was thought to be responsible for the lubricating action that led to optimum tenderness and leavening ability.

The invention is applicable to any culinary mixes comprising flour and shortening, the principal forms of which are cake mixes, such as a yellow or gold cake mix, chocolate cake mix, gingerbread and other bread and roll mixes, etc., biscuit and muffin mixes and pie crust mixes. These will be referred to generally as culinary mixes, and they include any of these mixes in which the proportions of flour and shortening and any other ingredients that are included are such as to produce an edible culinary product.

It is believed that the method of mixing the liquid super-cooled shortening with flour and other ingredients is not only novel, but that the resulting mixes are also novel due to a different relation between the flour and the crystalline structure of the shortening which is developed because the final crystallization and/or tempering of the shortening takes place while it is in contact with the flour. This produces an advantageous composition, the exact nature of which is not known and which can best be described in terms of the method by which it is produced.

In order not to lengthen the application unduly, the invention will be illustrated by describing mixes in the form of a yellow cake mix, since this is often used as a standard in the cake making and shortening art, and is one of the most exacting to achieve. It is believed that a demonstration of the superiority of the invention in connection with a cake mix would be the most effective since it is the most difficult. It will be understood, of course, that the invention is equally applicable to other flour and shortening containing mixes with or without other ingredients normally present in baked goods.

The essential ingredients in a yellow cake are flour, sugar, shortening, whole eggs, milk, a leavening agent and flavorings. The proportions in the conventional yellow cake formula vary within ranges well known in the art and are described by Bailey. In a yellow cake mix these same proportions are used, except that dried whole eggs and dried milk are employed in an amount equivalent to the solid content of the amount of these ingredients in the conventional cake formula, because the water content of the eggs and milk is added later when the mix is prepared for baking.

In judging a cake there are a number of criteria which are more or less subjective, such as grain character, crumb texture, color, etc. These are difficult to describe in any positive or mathematical standards or even to compare with other cakes except in general terms of superiority and inferiority. For this reason the superiority of cakes made in accordance with the invention will be described in connection with cake volume. This is the criterion generally recognized in the art, because two cakes which are otherwise made the same, except for the shortening, will be judged as to shortening performance in terms of larger cake volume providing, of course, the other factors are not unduly sacrificed.

In order to demonstrate that the exact method of mixing the ingredients is not critical, two mixing methods were employed using the same proportion of ingredients in all instances. (1) The creaming method: This consists of creaming the shortening and the sugar and then adding all of the remaining ingredients and mixing them. (2) The premix method: This consists of mixing all of the dry ingredients and then adding the shortening and mixing.

The following two yellow cake mixes were prepared using the same portion of ingredients in each instance utilizing the creaming method.

Mix #1

This mix used a votated shortening in the plastic condition, i. e., which had been packed in drums and tempered. The creaming time for the shortening and the sugar was 4 minutes and the mixing time of the other ingredients after the creaming was 3½ minutes.

*Mix #2*

This mix used freshly votated liquid shortening. The temperature of the ingredients was roughly the same except that the shortening was about 84° F. since this was its temperature in the freshly votated condition. Creaming time was 2 minutes and the mixing time after creaming was 2 minutes. This somewhat shorter mixing time is explained by the fact that the shortening is in a liquid condition and requires less mixing, an advantage that has been explained heretofore. The time for mixing depends largely on the condition of the ingredients and is determined by examination of the mix to determine when it is complete.

In both of the above mixes, as in all others described, the amount of air dispersed in the shortening is the same, namely 10% by volume in the plastic and in the freshly votated shortenings. An inert gas, such as carbon dioxide or nitrogen, may be used instead of air.

These mixes were prepared and baked as follows: 900 grams of the mix was placed in a standard kitchen cake mixer and 160 grams of water added and mixed for three minutes, following which an additional 160 grams of water was added slowly while the mixer was running. The bowl was scraped down and mixed one minute more, the total mixing time being 5 minutes. The mixture was placed in a 9 inch cake tin in an amount of 14 ounces and baked at a temperature of 350° F. for 22 minutes. When a loaf cake was baked, 200 grams of the mixture was baked in a loaf cake pan at 350° F. for 55 minutes. The results are as follows:

Table A

| | Loaf Volume | Layer Volume |
|---|---|---|
| | Cc. | Cc. |
| Mix #1 | 1,325 | 1,475 |
| Mix #2 | 1,370 | 1,590 |

The superiority of the Mix #2 made in accordance with the invention in both the loaf and the layer is readily apparent.

In this table and all others, the volume is expressed in terms of cubic centimeters of cake volume per pound of cake.

In order to demonstrate that the mix retains its desirable properties, even when stored, the mixes were stored at 80° F. and tests periodically made. In making these cakes, a slightly different mixing procedure was used to demonstrate that the mixing technique is not critical. 96 cc. of water was added to 450 grams of the mix and was mixed for 3 minutes at first speed on the kitchen mixer. The bowl was scraped down and 96 cc. of water was added to the mixture and mixed for 2½ minutes at second speed on the kitchen mixer. 14 ounces of the batter was scaled off in an 8 inch round pan and baked for 35 minutes at 350° F. The volume of the layers was measured and the results on mixes stored 9 and 120 days are shown in Table B following:

Table B

| | 9 days | 120 days |
|---|---|---|
| | Cc. | Cc. |
| Mix #1 | 1,560 | 1,355 |
| Mix #2 | 1,610 | 1,468 |

From this it will be seen that the mix made in accordance with the invention stores well and produces cakes with better volume than a mix made with a plastic shortening and similarly stored.

In order to demonstrate that the baking is not critical, Mixes #1 and #2 were baked on different days, after varying storage periods, in different ovens at different temperatures with consequently somewhat different results, but the superiority of the Mix #2 made in accordance with the invention is apparent. This is shown in Table C following:

Table C

| Test No | 1 | 2 | 3 | 4 | 5 |
|---|---|---|---|---|---|
| | Cc. | Cc. | Cc. | Cc. | Cc. |
| Mix #1 | 1,573 | 1,560 | 1,390 | 1,250 | 1,355 |
| Mix #2 | 1,585 | 1,610 | 1,450 | 1,370 | 1,468 |

The following two yellow cake mixes were prepared using the same proportion of ingredients in each instance and utilizing the premix method:

Mix #3

All the dry ingredients were mixed for 5 minutes at a temperature of about 64–68° and the plastic shortening at about this temperature which had been tempered and packaged was added and mixed for 15 minutes after mixing.

Mix #4

This is prepared the same except that the freshly votated shortening is added at a temperature of 84° and the temperature of the ingredients is about 10° higher so as not to unduly chill the shortening. The premixing time was 5 minutes but the mixing time after the shortening was added was 1 minute and 15 seconds, showing the very short time required to mix the freshly votated shortening.

In making cakes from these mixes, two methods were employed: In method #1, 86 cc. of water was added to 450 grams of the mix and mixed for 3 minutes at first speed. The bowl was scraped down and 86 cc. additional of water was added to the mix and mixed for 2½ minutes at second speed. 14 ounces of the batter was scaled off into an 8 inch round pan and baked for 35 minutes at 350° F. Method #2 was the same as method #1 except that 96 cc. of water was added in each addition.

The volume of the cakes was measured on the one day old, as well as the same mix after 6, 9 and 120 days storage. The results are shown in Table D following:

Table D

| | Method #1 | | | Method #2 | |
|---|---|---|---|---|---|
| | 1 day | 6 days | 120 days | 9 days | 120 days |
| | Cc. | Cc. | Cc. | Cc. | Cc. |
| Mix #3 | 1,500 | 1,493 | 1,418 | 1,560 | 1,382 |
| Mix #4 | 1,540 | 1,500 | 1,579 | 1,605 | 1,441 |

The following additional mixes using the premix method are further illustrative:

Mix #5

This is the same as Mix #3 except that the mixing time after the premix is 5½ minutes instead of 15 minutes.

Mix #6

This is substantially the same as Mix #4 except that the mixing time after the premixing is 2 minutes and the temperatures of the ingredients are about 10° lower than the temperature of the votated shortening.The results are shown in Table E following:

Table E

| | Method #1 | | | Method #2 | |
|---|---|---|---|---|---|
| | 1 day | 6 days | 120 days | 9 days | 120 days |
| | Cc. | Cc. | Cc. | Cc. | Cc. |
| Mix #5 | 1,500 | 1,493 | 1,402 | 1,558 | 1,468 |
| Mix #6 | 1,500 | 1,530 | 1,531 | 1,590 | 1,509 |

All of the above cakes were rated for the fineness of grain, tenderness of crumbs, uniformity of cell dispersion, color and texture of the crust, tenderness, flavor, etc. While these qualities are difficult to describe and compare mathematically, the experts examining and rating the cakes on these points invariably rated the cakes made from Mixes #2, #4 and #6 ahead of cakes made from corresponding Mixes #1, #3 and #5. In most instances the individual factors other than volume were superior. In no instance was any characteristic of the cakes of Mixes #2, #4 and #6 such as to detract in any way from the cake.

The following conclusions have been reached, after exhaustive testing and examination, with reference to cakes made from the above mixes that are 1 to 120 days old: Cakes using liquid super-cooled shortening are superior to cakes made from plastic shortening in the following respects: (a) greater volume, (b) greater storage ability of the mix, i. e., less loss of volume of cake on storage of mix, (c) better grain, (d) better tenderness.

In another test four chocolate cake mixes were made from cake flour, sugar, shortening, dried milk solids, dried egg solids, cocoa, leavening and flavoring agents. The proportions were the same in all four instances. However, two used the creaming method, one with plastic shortening (Mix #1A) and the other with freshly votated shortening (Mix #2A), and two used the premix method, one with plastic shortening (Mix #3A) and the other with freshly votated shortening (Mix #4A).

230 grams of water was mixed with 700 grams of the chocolate cake mix. One-half of the water was added and mixed for 2 minutes at second speed and the remaining half of the water added and mixed for 2 more minutes at second speed. The mixture was scaled off, 12 ounces in a 9 inch layer pan, and baked 25 minutes at a temperature of 375°. These four cakes were rated for uniformity of grain, volume and taste. In summary, the cakes made from Mix #4A were slightly superior to cakes made from Mix #2A which scored second. Cakes made from Mix #3A were inferior and scored third, and cakes made from Mix #1A scored fourth.

In all of the above examples, freshly votated shortening is used, but it is to be understood that other types of liquid super-cooled shortening may be employed.

The order of mixing, the proportions and temperature of mixing are not critical provided that they are those that would normally be used in acceptable culinary practice and which would be employed in making an edible culinary product.

In making a pie crust mix which does not contain sugar or leavening agents, the shortening is mixed directly with flour and salt. In this case, because of the semi-liquid condition of the shortening, the mixing time must be relatively short as compared with the mixing time of a plastic shortening. This suggests that the process may be used for a continuous mixing operation instead of the conventional batch process, that is, a continuous stream of the liquid super-cooled shortening can be mixed with a continuous stream of flour in measured proportions for a short time and the mixture directly packaged. In making the biscuit mixes, the leavening agent and any other ingredients may be included.

The mix need not be packaged but may have liquid ingredients added thereto after mixing, such as might be done in a bakery.

It is believed that it will be apparent from the above description of my invention that not only is the product made in accordance with the invention superior to that made when using plastic shortening, but that this is contrary to the belief in the art that plasticity was essential in a shortening before it was mixed with the flour and that shortenings in a liquid form were undesirable. It is also believed apparent that in addition to this advantage insofar as the superiority of the product is concerned, the invention has the advantage of adapting the premixing processes to a continuous basis, utilizing the shortening in its liquid super-cooled state without requiring packaging, and using it in a condition which requires shorter mixing time and less mixing power.

It will be apparent that culinary mixes, other than those having the precise formulations described herein, may be made in accordance with the invention and will have the advantages described therefor and all such variations are included within the scope of the invention as fall within the following claims.

I claim:

1. A method of making a culinary mix having ingredients comprising flour and shortening in proportions to form an edible culinary product when the mix is mixed with an aqueous edible liquid and baked, which method comprises mixing the ingredients of the mix comprising flour with shortening in a liquid, super-cooled condition.

2. A method of making a culinary mix having ingredients comprising flour, sugar and shortening in proportions to form an edible culinary product when the mix is mixed with an aqueous edible liquid and baked, which method comprises mixing the ingredients of the mix comprising flour and sugar with shortening in a liquid, super-cooled condition.

3. A method of making a cake mix having ingredients comprising flour, sugar, egg and milk solids, shortening and a leavening agent in proportions to form an edible cake when the mix is mixed with an aqueous edible liquid and baked, which method comprises mixing the above named ingredients with shortening in a liquid, super-cooled condition.

4. A method of making a pie crust mix having ingredients comprising flour and shortening in proportions to form an edible pie crust when the mix is mixed with an aqueous edible liquid and baked, which method comprises mixing the ingredients of the mix comprising flour with shortening in a liquid, super-cooled condition.

5. A method of making a biscuit mix having ingredients comprising flour, shortening and a leavening agent in proportions to form edible biscuits when the mix is mixed with an aqueous edible liquid and baked, which method comprises mixing the flour and leavening agent with shortening in a liquid, super-cooled condition.

6. A method of making a culinary mix that can be baked into an edible product, which comprises mixing ingredients comprising flour with shortening in a liquid, super-cooled condition.

7. A method of making a culinary mix having ingredients comprising flour and shortening in proportions to form an edible culinary product when the mix is mixed with an aqueous edible liquid and baked, which comprises rapidly chilling shortening stock with agitation so as to develop crystal nuclei but with a substantial proportion in a super-cooled condition, so that the shortening is liquid and mixing the ingredients comprising flour with the shortening while in said liquid, super-cooled condition.

8. A continuous method of making a culinary mix consisting of shortening in a liquid, super-cooled condition and other ingredients comprising flour, which comprises continuously feeding together said shortening and said other ingredients at a related and measured rate, continuously mixing said shortening and other ingredients, and continuously withdrawing the mixture when complete.

*9. The method of claim 2 in which the shortening in the liquid super-cooled condition is mixed with the sugar before it is mixed with the flour.*

*10. The method of claim 3 in which the shortening in the liquid super-cooled condition is mixed with the sugar before it is mixed with the flour and the other ingredients.*

OGDEN JOHNSON.

REFERENCES CITED

The following references are of record in the file of this patent or the original patent:

UNITED STATES PATENTS

| Number | Name | Date |
|---|---|---|
| 269,743 | Thorpe | Dec. 26, 1882 |
| 1,103,355 | Fabel | July 14, 1914 |
| 1,117,012 | Estabrook | Nov. 10, 1914 |
| 1,203,905 | Paessler | Nov. 7, 1916 |
| 1,925,376 | Farrell | Nov. 23, 1932 |
| 2,065,676 | Fechner | Dec. 29, 1936 |
| 2,325,393 | Green | July 27, 1943 |
| 2,332,074 | Griffith | Oct. 19, 1943 |

FOREIGN PATENTS

| Number | Country | Date |
|---|---|---|
| 971 | Great Britain | of 1878 |
| 413,343 | Great Britain | July 13, 1934 |